US008266629B2

(12) United States Patent
Inoue et al.

(10) Patent No.: US 8,266,629 B2
(45) Date of Patent: Sep. 11, 2012

(54) VIRTUAL MACHINE SYSTEM, HYPERVISOR IN VIRTUAL MACHINE SYSTEM, AND SCHEDULING METHOD IN VIRTUAL MACHINE SYSTEM

(75) Inventors: Hironori Inoue, Ebina (JP); Shuhei Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 464 days.

(21) Appl. No.: 12/628,342

(22) Filed: Dec. 1, 2009

(65) Prior Publication Data

US 2010/0138831 A1  Jun. 3, 2010

(30) Foreign Application Priority Data

Dec. 2, 2008 (JP) .................................. 2008-306964

(51) Int. Cl.
G06F 9/46 (2006.01)
G06F 9/455 (2006.01)

(52) U.S. Cl. ........................................... 718/108; 718/1
(58) Field of Classification Search ................ 718/1, 108
See application file for complete search history.

(56) References Cited

U.S. PATENT DOCUMENTS 5,452,452 A * 9/1995 Gaetner et al. ................. 718/103
7,937,710 B1 * 5/2011 Silkebakken et al. .......... 718/108

FOREIGN PATENT DOCUMENTS

| JP | 7-141208 A | 6/1995 |
| JP | 2001-282558 A | 10/2001 |
| WO | 2006/012019 A1 | 2/2006 |

* cited by examiner

*Primary Examiner* — Thomas Lee
*Assistant Examiner* — Terrell Johnson
(74) *Attorney, Agent, or Firm* — Mattingly & Malur, PC

(57) ABSTRACT

Attempts are made to reduce the system overhead generated at the time of context save/restore processing to perform process switching in a virtual machine system. In a CPU occupancy mode that a physical CPU is exclusively allocated to virtual machines, a logical CPU process running on the physical CPU is static, so that it is not necessary to save/restore the context every time the processes are switched. When a switching source process is a logical CPU process in a CPU occupancy mode, a context save is temporarily suspended. When switching to the same logical CPU process is made again continuously, save/restore is skipped. When the logical CPU process of a VMM control VM runs in that period, the logical CPU process whose save is delayed is recorded and saved late.

5 Claims, 13 Drawing Sheets

UPDATE PROCESSING
OF PREVIOUS LOGICAL
CPU PROCESS

CONTEXT SAVE

VIRTUAL MACHINE SYSTEM, HYPERVISOR IN VIRTUAL MACHINE SYSTEM, AND SCHEDULING METHOD IN VIRTUAL MACHINE SYSTEM

INCORPORATION BY REFERENCE

The present application claims priority from Japanese application JP2008-306964 filed on Dec. 2, 2008, the content of which is hereby incorporated by reference into this application.

TECHNICAL FIELD

The present invention relates to a virtual machine system, and more particularly to scheduling of plural virtual machines in a virtual machine system that logically divides a physical machine to use as the plural virtual machines.

BACKGROUND ART

In recent years, a computer system, a so-called embedded system, that is incorporated into various types of machines and equipment to perform control for realization of a particular function, is being watched with interest, and its applied fields are expanding. Embedded software used for the embedded system is required to have so-called real-time performance that performs processing by responding within a predetermined time period after accepting a request for processing. Therefore, the embedded system often adopts a real time OS (Operating System).

As described above, the real time OS must ensure a response within a predetermined time period. Therefore, there is adopted as indispensable technology a so-called multithread function or multitask function that a single application process is divided into plural processing units and the execution rights are switched thereby processing in parallel at the same time. Here, one processing unit which is a substance to execute the program is generally called a process.

When plural processes are switched, "contexts" used for processing in the processes performed by the CPU are generally switched. Here, the contexts are associated with the respective processes and include a current flag status of a register set (a general purpose register, a floating-point register, a status register, a program counter, and the like) and information for execution of the respective processes. When the contexts are switched, it is necessary to store the context of the process having been executed and to read the context of the process to be executed newly. The time required to perform the switching operation is called overhead, and the overhead is generated every time the context is switched.

As technology to reduce the overhead required when the contexts are switched by the real time OS on the physical machine, for example, Japanese Patent Laid-Open No. 07-141208 "Multi-task processor" describes a multitask processor using the real time OS. Specifically, there is described a method that plural register banks to be occupied in corresponding with the respective processes are disposed, and the context save/restore is performed by switching the register banks, thereby the schedule time is reduced.

This problem of the overhead related to the switching of the contexts is not limited to the physical machine but also involved in a virtualization layer VMM (Virtual Machine Monitor) of the virtual machine system. Generally, the VMM treats the logical CPU of each VM (Virtual Machine) as one process, and plural active processes are included in the system at the same time, thereby realizing real time performance. Therefore, the context save/restore processing at the time of switching the processes in the VMM becomes the system overhead.

Technology related to a context save/restore processing in a virtual machine system that operates plural OSs on a physical machine is described in, for example, Japanese Patent Laid-Open No. 2001-282558 "Multi-operating computer system".

Japanese Patent Laid-Open No. 2001-282558 has plural OSs simultaneously not by a VM system in which the VMM emulates hardware but by a system in which an OS switching program is disposed outside of the OS to distribute the interruption. As technology to reduce the overhead of the context save/restore at the time of switching the OSs, there is described a system wherein the OSs are provided with a communication handler function, and a processing request among the OSs is processed by interrupting.

The method for overhead reduction to switch the context for a physical machine described in the above-described Japanese Patent Laid-Open No. 07-141208 "Multi-task processor" is also applicable to the VMM of the virtual machine system. Since the application of the relevant method does not generate a context save/restore processing to an external memory, it becomes possible to realize a high-speed switching of the context accordingly. But, since the hardware resource provided as a register bank is generally limited, a system having many contexts to be treated such as a virtual machine system has an amount of register which becomes necessary as the register bank and becomes enormous, and it cannot be said that it is a very realistic structure.

Since the method described in Japanese Patent Laid-Open No. 2001-282558 involves a modification of OS, it is also necessary to modify the application operating on it, and it has a problem that an application significant for business might fail to operate.

An object of the present invention is to reduce overhead due to switching of contexts without involving a modification of OS or the like in a virtual machine system according to a VM method.

SUMMARY OF THE INVENTION

When a switching source process is a logical CPU process of a CPU occupancy mode, the context save needed when the OS is operating is temporarily suspended. When continuously switched to the same logical CPU process again, save/restore is skipped. If a logical CPU process of a VMM control VM runs in that period, the logical CPU process which is saved late is recorded and save is delayed.

According to the invention, when a process on the VMM is switched in a virtual machine system, overhead due to switching of context of a logical CPU process allocated to the VM can be reduced. And, the contexts of the individual processes do not cause contradiction. Thus, an efficient operation of the CPU resource becomes possible, and improvement of general-purpose performance is expected.

A virtual machine system according to the invention comprises a physical CPU; a hypervisor which logically divides the physical CPU to have plural virtual machines; and a virtual machine control memory for storing data used by the hypervisor to control the virtual machines, wherein the virtual machine control memory has first data for a first virtual machine and second data for a second virtual machine; and the hypervisor stores the first data into an internal memory within the physical CPU when the first virtual machine operates; (a) holds the first data in the internal memory when the first virtual machine terminates its operation; (b) determines whether or not the second virtual machine to be performed next uses data stored in the virtual machine control memory; and (c) moves the data in the internal memory between the internal memory and the virtual machine control memory according to the determination.

According to the invention, at the time of the determination, (d) when the second virtual machine uses new data from the virtual machine control memory to the internal memory, the first data is moved (saved) to the virtual machine control memory, and the data used by the second virtual machine is moved (restored) from the virtual machine control memory to the internal memory of the physical CPU; and (e) when the second virtual machine does not use new data, the movement (save and restore) between the virtual machine control memory and the internal memory is omitted.

According to the invention, a hypervisor for a virtual machine system including a physical CPU; a hypervisor which logically divides the physical CPU to have plural virtual machines; and a virtual machine control memory for storing data used by the hypervisor to control the virtual machines, comprises a processing section for switching schedules of the virtual machines, wherein (a) the processing section instructs, when the process by the virtual machines is completed, to hold the process data in an internal memory of the physical CPU; (b) determines whether or not the virtual machine to be executed next uses the data stored in the virtual machine control memory; and (c) moves the data in the internal memory between the internal memory and the virtual machine control memory according to the determination.

According to the invention, at the time of the determination, (d) when the virtual machine to be executed next uses new data from the virtual machine control memory to the internal memory, the process data is moved (saved) into the virtual machine control memory, and the data used by the virtual machine to be executed next is moved (restored) from the virtual machine control memory to the internal memory; and (e) when the virtual machine to be executed next does not use new data, the movement (save and restore) between the virtual machine control memory and the internal memory is omitted.

According to the invention, a scheduling method for a virtual machine system including a physical CPU; a hypervisor which logically divides the physical CPU to have plural virtual machines; and a virtual machine control memory for storing data used by the hypervisor to control the virtual machines, comprises (a) instructing to hold the process data in an internal memory of the physical CPU when the process by the virtual machine is completed; (b) determining whether or not the virtual machine to be executed next uses data stored in the virtual machine control memory; and (c) moving the data in the internal memory between the internal memory and the virtual machine control memory according to the determination.

According to the invention, the determination step includes (d) when the virtual machine to be executed next uses new data from the virtual machine control memory to the internal memory, the process data is moved (saved) into the virtual machine control memory, and the data used by the virtual machine to be executed next is moved (restored) from the virtual machine control memory to the internal memory; and (e) when the virtual machine to be executed next does not use new data, the movement (save and restore) between the virtual machine control memory and the internal memory is omitted. As described above, the characteristics of a logical partitioning method for a physical CPU are used to devise a scheduling method capable of completely skipping the context save/restore needed for the OS operation. Thus, the reduction of the overhead due to the context switching is realized without involving a modification of the OS.

Specifically, in the CPU occupancy mode that the physical CPU is exclusively allocated to the virtual machines, the logical CPU process running on the physical CPU is static, so that it is not necessary to save/restore the context every time the process is switched. When the context save/restore processing is unnecessary, the save/restore processing is skipped to reduce the overhead.

Other objects, features and advantages of the invention will become apparent from the following description of the embodiments of the invention taken in conjunction with the accompanying drawings.

DESCRIPTION OF THE EMBODIMENTS

Examples of the invention will be described below with reference to the drawings.

FIG. 1 to FIG. 7 show a data structure according to an embodiment of the invention, and FIG. 8 to FIG. 16 show a processing method.

Figure 1:
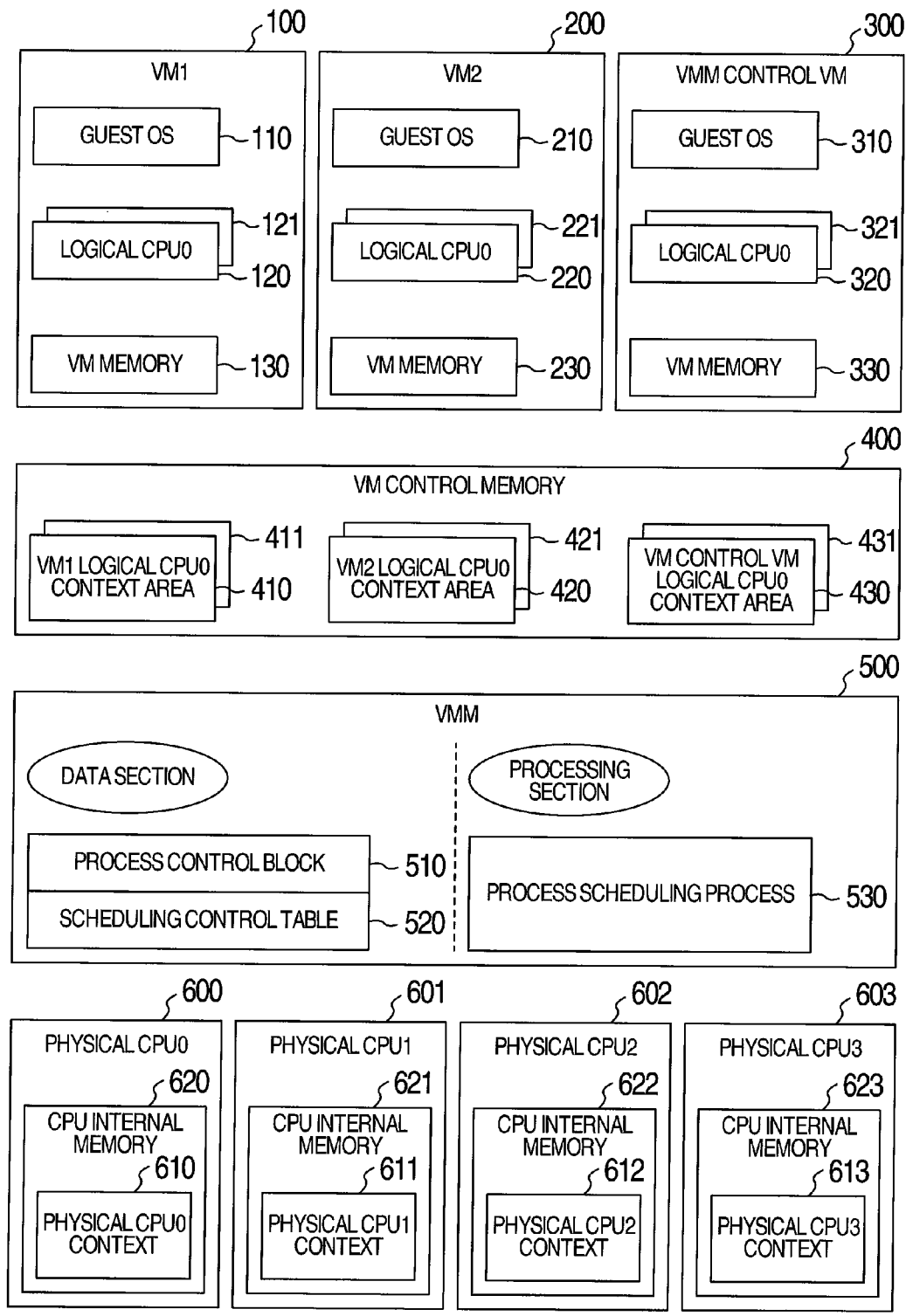
FIG. 1 is a virtual machine system configuration diagram according to an embodiment of the invention.

FIG. 1 is a configuration diagram showing the embodiment of the virtual machine system to which the present invention is applied.

VMM 500 of this embodiment may be software running on a physical machine and has functions to create VMs 100, 200, 300 by logically dividing (partitioning) physical machine resources such as physical CPUs 600, 601, 602, 603 and to manage and control them. In FIG. 1, the VMM 500 is a hypervisor.

Specifically, the logical division (partition) of the physical CPU means that one or plural physical CPUs are shared among plural logical CPUs (120, 121, 220, 221, 320, 321 in this case), and the sharing logical CPUs are scheduled on the physical CPUs at a given time interval.

The VMM 500 handles the respective logical CPUs as a single process and performs scheduling (selects a logical CPU to be allocated to the physical CPU) at this processing unit. To realize the scheduling by this process, the VMM has two data structures of a process control block 510 and a scheduling control table 520, and a process scheduling processing 530.

VMs are created by the scheduling process performed by the VMM, and guest OSs 110, 210, 310 can be operated on the individual VMs.

This embodiment of the invention includes the VM 300 for controlling the VMM in addition to the VMs such as VM1 and VM2 defined by the user. The VM 300 is VM dedicated for VMM control and has roles to operate VMM management middleware on the guest OS and to control logical partitioning of a physical resource such as I/O.

The virtual machine system has a memory region 400, which is used by the VMM to control the VMs, in addition to the memories 130, 230, 330 allocated to the VMs.

Internal memories 620, 621, 622, 623 within the physical CPUs hold contexts 610, 611, 612, 613 of the operating processes. Meanwhile, a VM control memory has one of usage that stores a context at the time of process switching. In this embodiment of the invention, context areas 410, 411, 420, 421, 430, 431 are disposed for the individual logical CPUs of the VMs.

Figure 2:
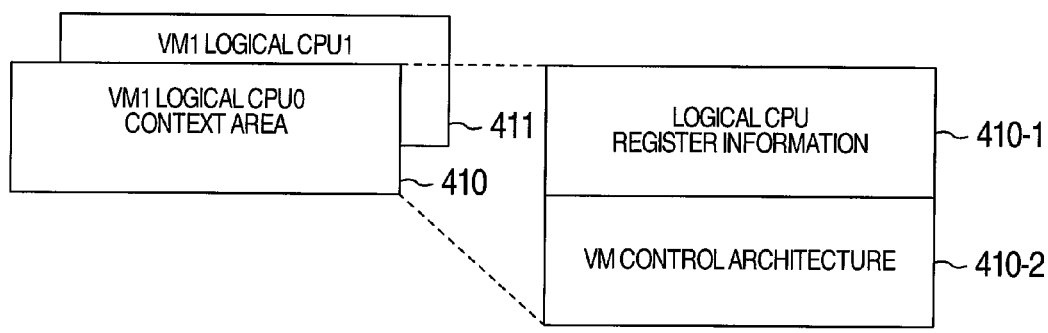
FIG. 2 is a diagram showing the construction of a logical CPU context area according to the embodiment of the invention.

As shown in FIG. 2, register information 410-1 of the logical CPU and a VM control architecture 410-2 of the logical CPU are stored in the context area of the logical CPU.

This context area of the logical CPU is corresponded with the contexts 610, 611, 612, 613 of the physical CPUs.

Figure 3:
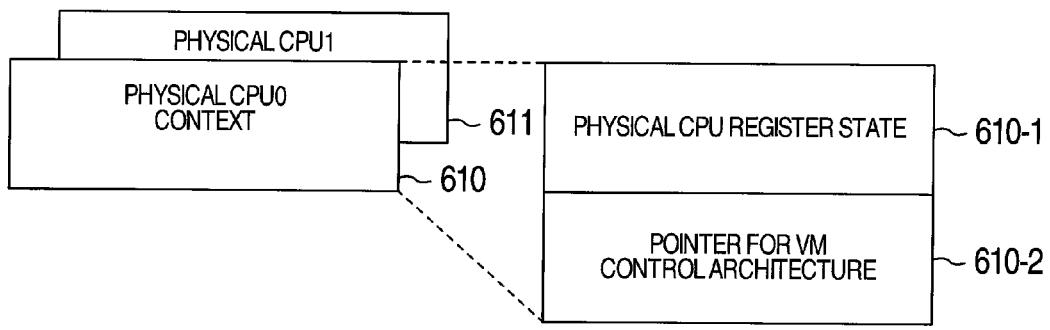
FIG. 3 is a diagram showing the construction of a physical CPU context according to the embodiment of the invention.

As shown in FIG. 3, the physical CPU context has a register state 610-1 and a pointer 610-2 for a VM control architecture, which are corresponded with the register information 410-1 and the VM control architecture 410-2 of the logical CPU. The switching of the process is a factor to save/restore the register information between the physical CPU and the memory region or to rewrite the pointer of the VM control architecture. Details of the processing are described as a specific example with reference to FIG. 8.

A detailed data structure of a VMM data section and two process scheduling modes, a CPU occupancy mode and a CPU sharing mode, are described below.

Figure 6:
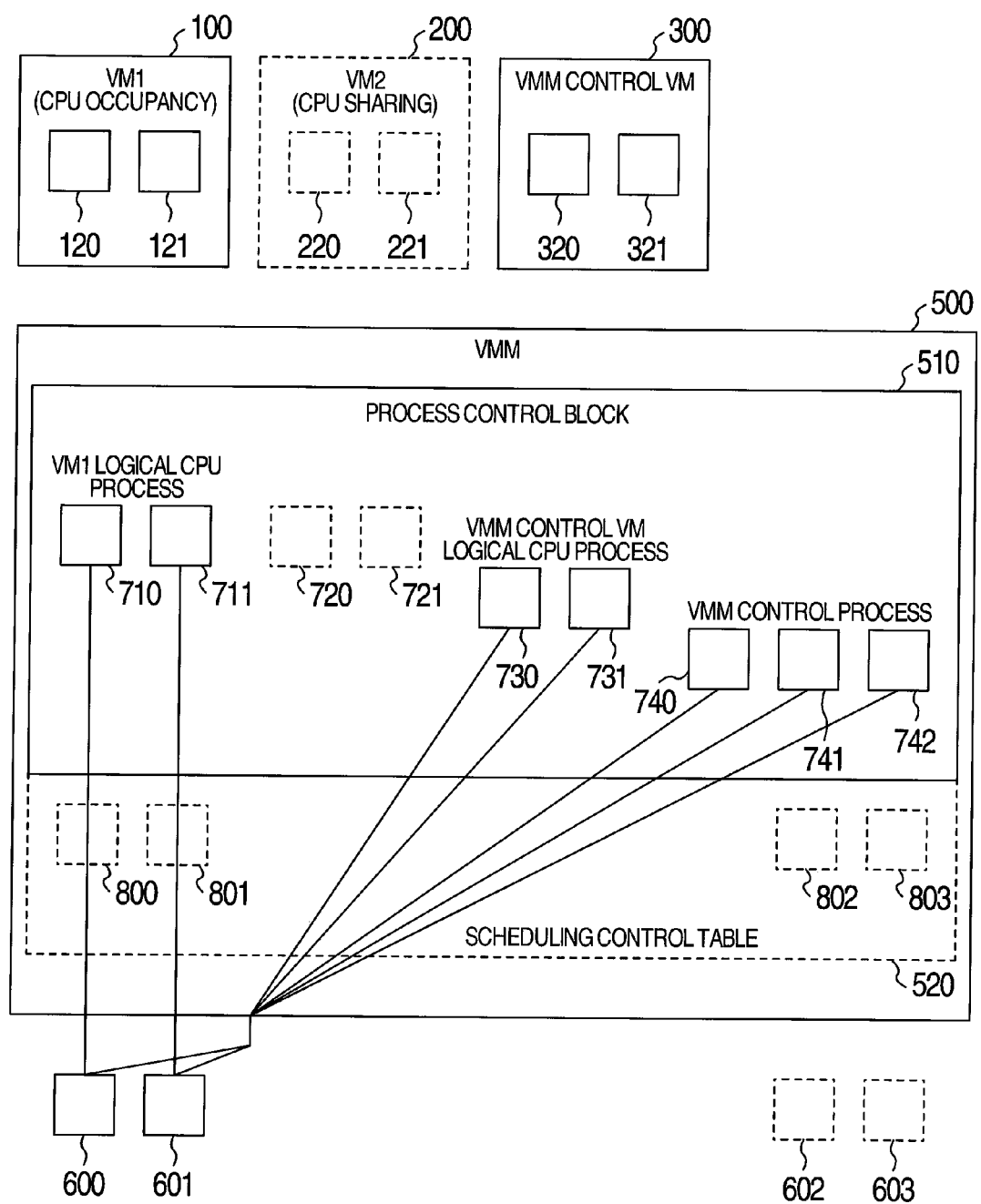
FIG. 6 is a diagram showing a data structure in the VMM and a CPU occupancy mode of process scheduling according to the embodiment of the invention.
Figure 7:
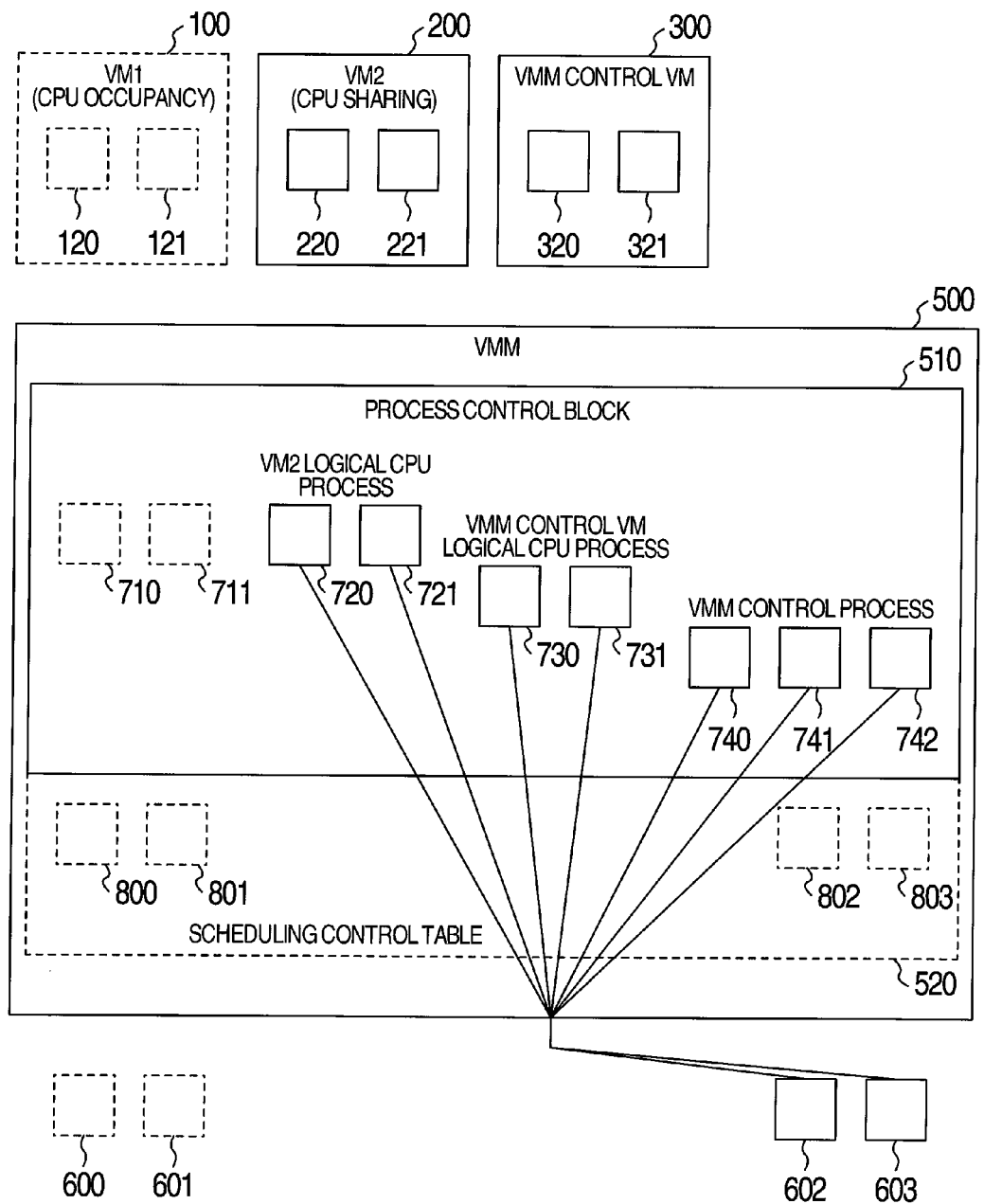
FIG. 7 is a diagram showing a data structure in the VMM and a CPU sharing mode of process scheduling according to the embodiment of the invention.

FIG. 6 and FIG. 7 are diagrams showing the detailed data structure of the VMM data section and the two scheduling modes which are called as the CPU occupancy mode (FIG. 6) and the sharing mode (FIG. 7). The data structure and the scheduling modes are sequentially described in detail. The process control block has a data structure having realized a process which is a processing unit to execute the above-described program. This process provides an address space and a physical CPU for execution of the program. The process includes VMM control processes 740, 741, 742 to perform the system processing within the VMM in addition to logical CPU processes 710, 711, 720, 721, 730, 731 which execute the virtual machine program to materialize the virtual CPU of the VM.

Figure 4:
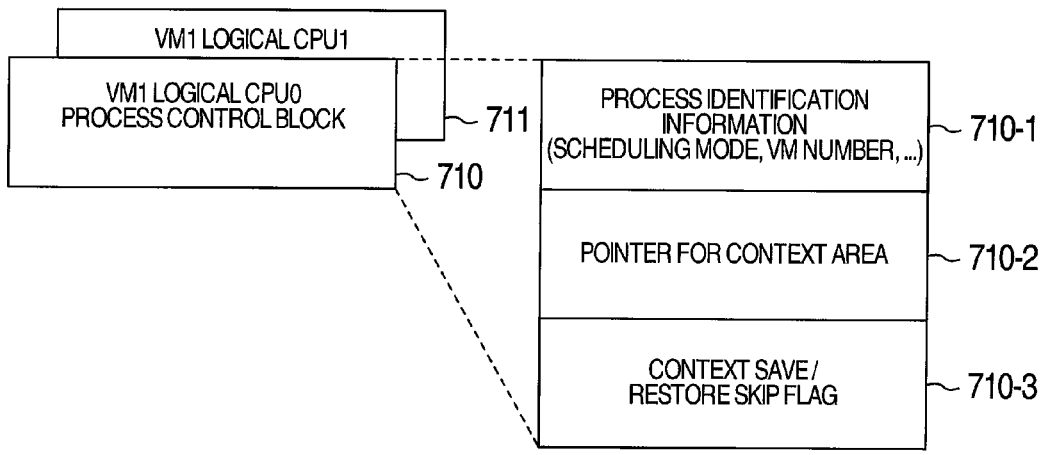
FIG. 4 is a diagram showing the construction of a process control block according to the embodiment of the invention.

As shown in FIG. 4, the individual process control blocks have process identification information 710-1 such as a scheduling mode and VM number, a pointer 710-2 for the context area of the relevant logical CPU, and a flag 710-3 for controlling the context save/restore skip. It is determined below that the term "process" used alone shall mean its realized process control block.

Figure 5:
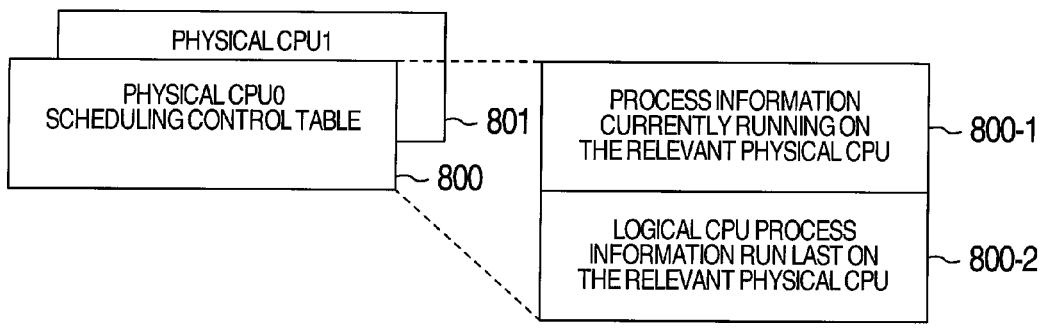
FIG. 5 is a diagram showing the construction of a scheduling control table according to the embodiment of the invention.

Scheduling control tables 800, 801, 802, 803 in FIG. 5 are provided for the individual physical CPUs and have information on the process schedules in the relevant physical CPUs. Such information corresponds to pointer 800-1 on the process currently running on the relevant physical CPU and pointer 800-2 on the logical CPU process having run last on the relevant physical CPU shown in FIG. 5.

In the CPU occupancy mode of FIG. 6, the logical CPU process is exclusively scheduled on one particular physical CPU.

In FIG. 6, the logical CPU processes 710, 711 of the VM1 in the CPU occupancy mode are exclusively scheduled for the physical CPUs 600, 601. Even in the CPU occupancy mode, the logical CPU processes 730, 731 of a VMM control VM and the VMM control processes 740, 741, 742 to perform the internal processing of the VMM are scheduled for the relevant physical CPU with priority over the logical CPU process irrelevant to the physical CPU occupancy state.

Meanwhile, in the CPU sharing mode of FIG. 7, the logical CPU process scheduled by any one of arbitrary physical CPUs excluding the physical CPU which is exclusively used by the logical CPU in the occupancy mode. In FIG. 7, the physical CPUs 600, 601 are used as the CPU occupancy mode. Therefore, the logical CPU processes 720, 721 of the VM2 in the CPU sharing mode are dynamically scheduled for the physical CPUs 602, 603. Similar to the case of the CPU occupancy mode, the logical CPU processes 730, 731 of the VMM control VM and the VMM control processes 740, 741, 742 are scheduled for the relevant physical CPU with priority over the logical CPU process.

In this example, application to the CPU occupancy mode is assumed, and its realization method is described below.

A processing method according to the invention is described below.

Figure 8:
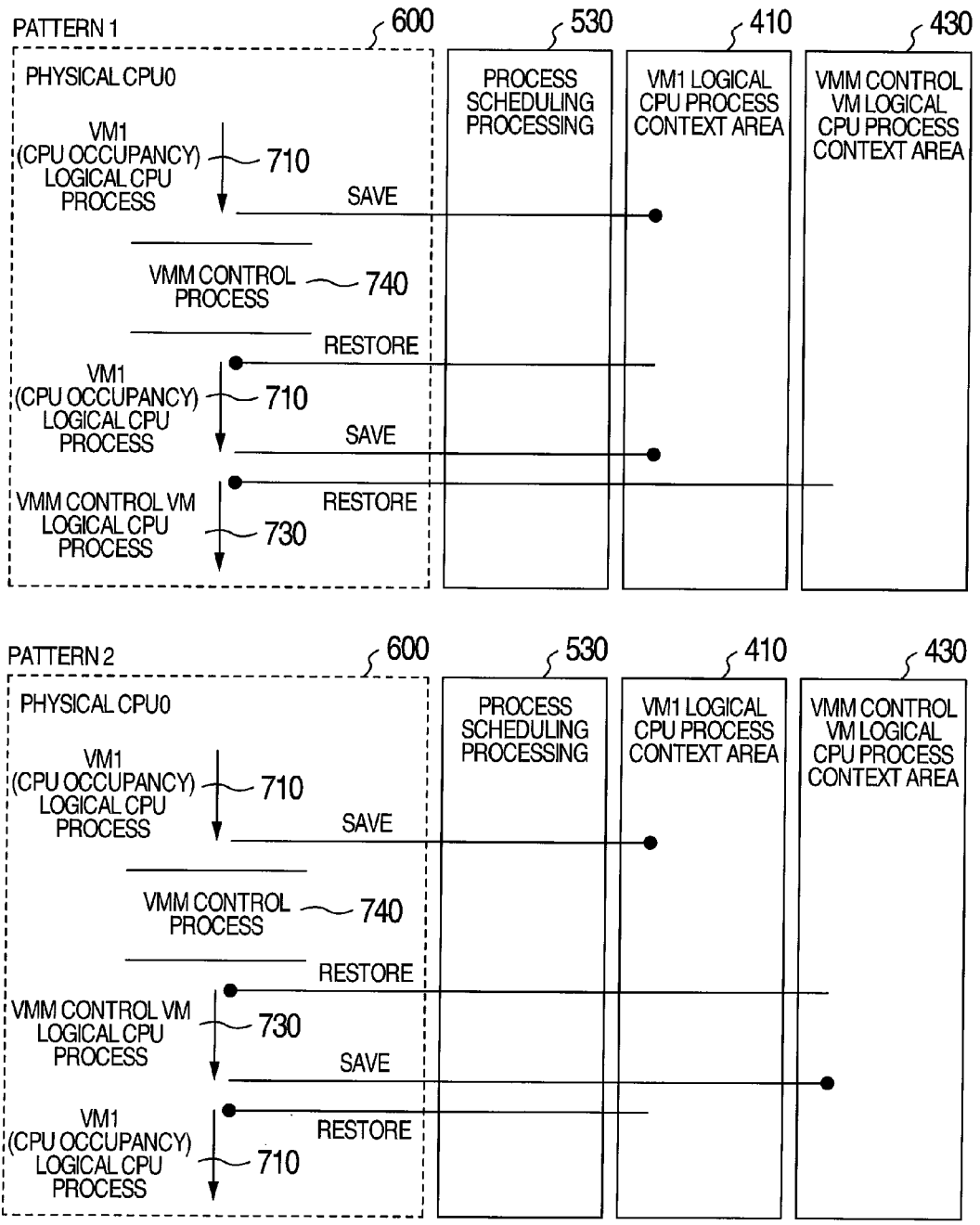
FIG. 8 is a diagram showing the concept of context save/restore before the present invention is introduced according to the embodiment of the invention.
Figure 9:
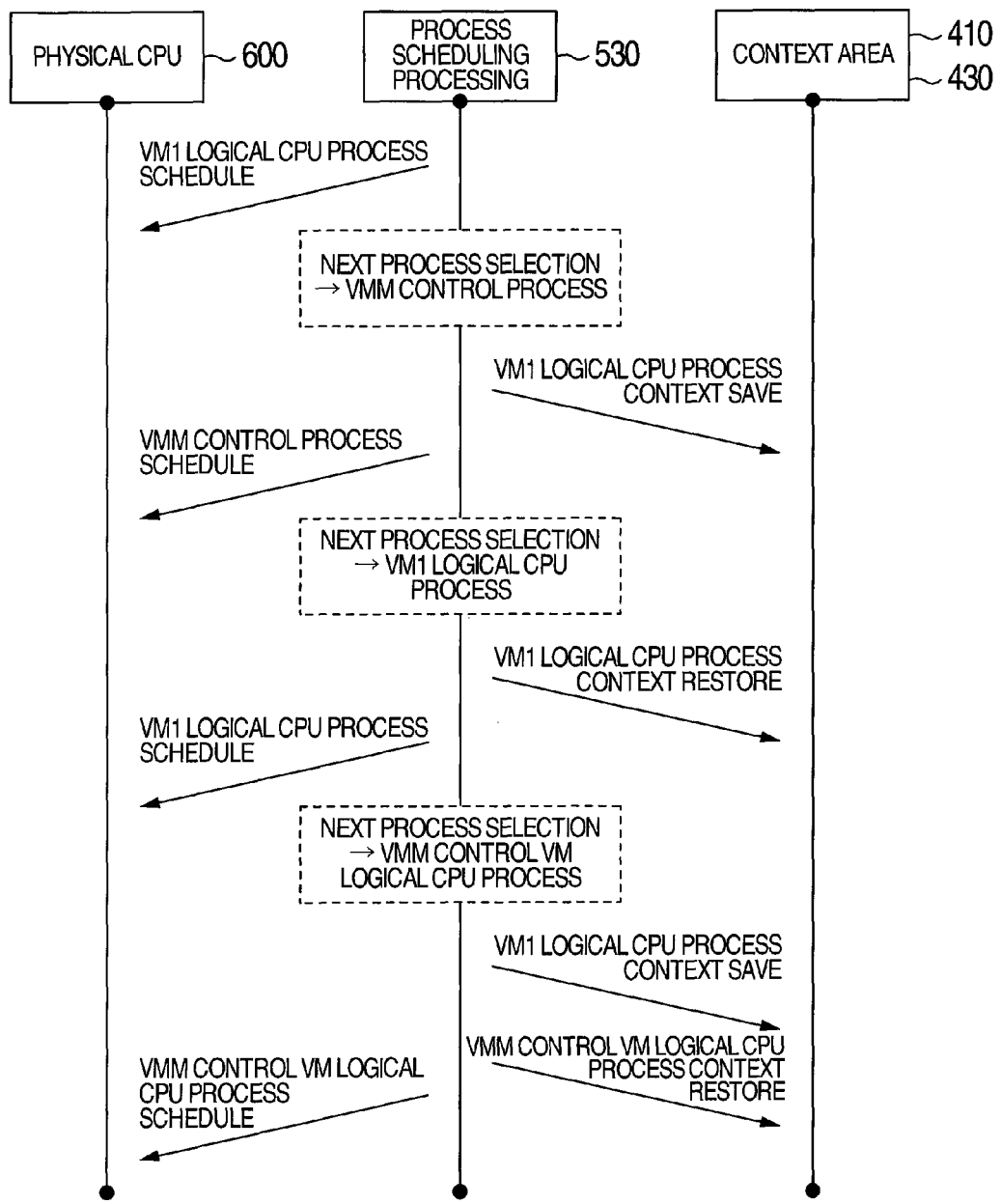
FIG. 9 is a diagram showing processing of pattern 1 of FIG. 8 by a time chart.

FIG. 8 is a concept diagram of a conventional context save/restore processing. FIG. 9 shows a time chart of the pattern 1 shown in FIG. 8.

For the physical CPU 600 in the CPU occupancy mode, the process scheduling processing 530 exclusively schedules the logical CPU process 710. When the logical CPU process 710 has completed the execution of the program of the VM1, the process scheduling processing 530 selects a next process. For example, it is assumed that the VMM control process 740 is selected. Since the logical CPU process 710 temporarily stops its processing here, the process scheduling processing 530 saves the context of the physical CPU at the time of stopping the processing. Specifically, the register state 610-1 of the physical CPU is stored as the register information 410-1 of the logical CPU into the context area 410 of the corresponding logical CPU, the pointer for the VM control architecture 410-2, which is referred to by the pointer 610-2 for the VM control architecture, is released. The release of the pointer means that the address for the VM1 written in the pointer 610-2 for the VM control architecture is rewritten (or erased) to a VMM control address.

After the VMM control process 740 has been through the processing, a certain logical CPU process is selected, but because of the CPU occupancy mode, the logical CPU process to be selected here is either the logical CPU process of the VM1 again or the logical CPU process of the VMM control VM.

It is assumed here that the logical CPU process 710 of the VM1 is selected again. Then, the process scheduling processing 530 restores the previously saved context from the corresponding region before the logical CPU process 710 starts to execute a program. Specifically, the register information 410-1 of the logical CPU is recovered to the register 610-1 of the physical CPU again from the context area 410 of the corresponding logical CPU and registered into the pointer 610-2 for the VM control architecture, namely the address is rewritten (or written) such that the VM control architecture 410-2 can be referred to.

If the logical CPU process 710 has completed the processing and the next selected process is the logical CPU process 730 of the VMM control VM, the context of the logical CPU process 710 is saved into the dedicated region again, and the context of the VMM control VM is restored (recovered).

What is described above is the context save/restore process involved in the conventional process switching. This save/restore is performed every time when the logical CPU process is scheduled.

The pattern 2 shows a case where the logical CPU process of the VM1 is not continuously run after the processing of the VMM control process 740, and the logical CPU process of the VMM control VM is selected. In the same manner as the pattern 1 excepting the running sequence of the process, the context save/restore is performed every time when the logical CPU process is scheduled.

Figure 10:
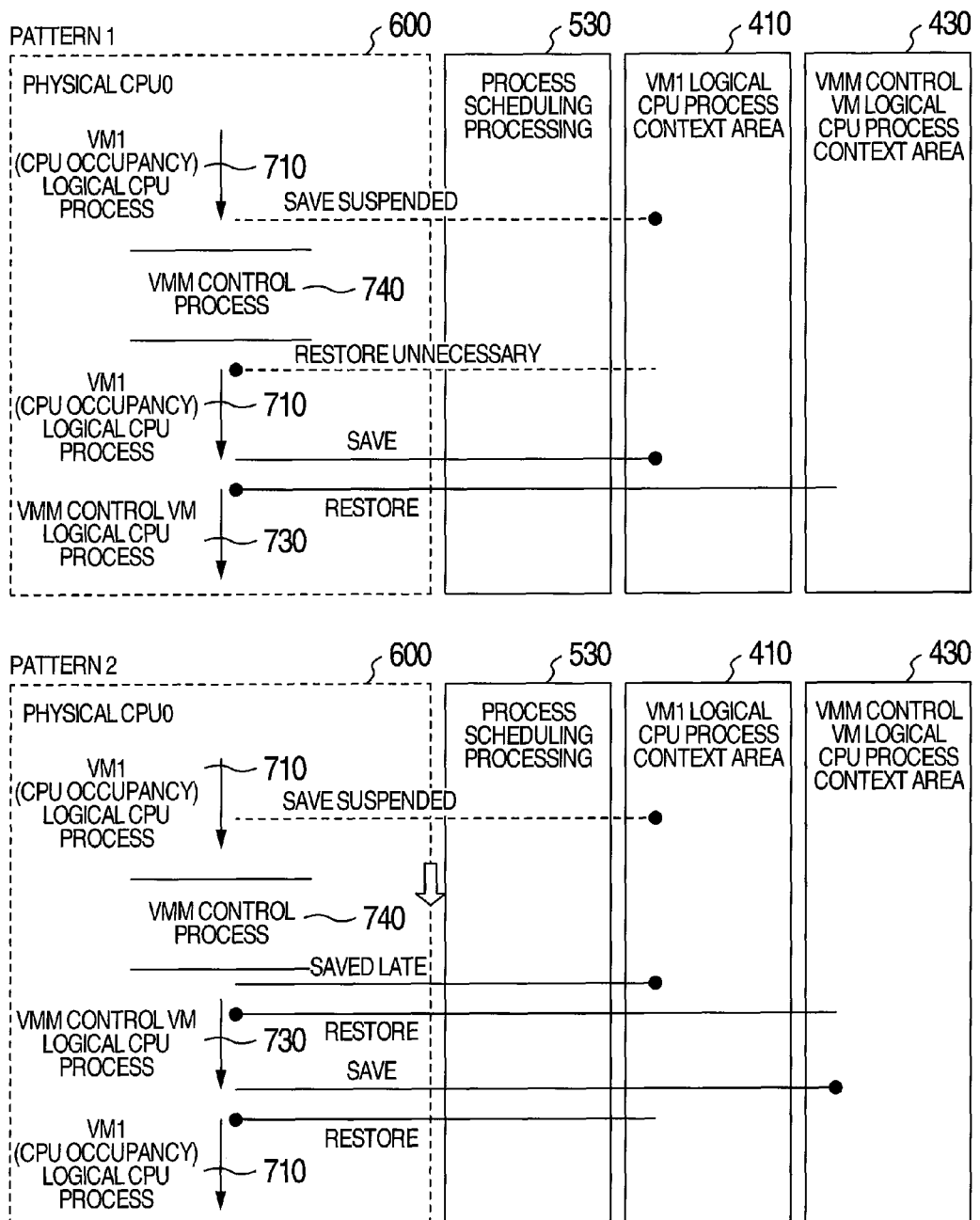
FIG. 10 is a diagram showing the concept of context save/restore after the present invention is introduced according to the embodiment of the invention.
Figure 11:
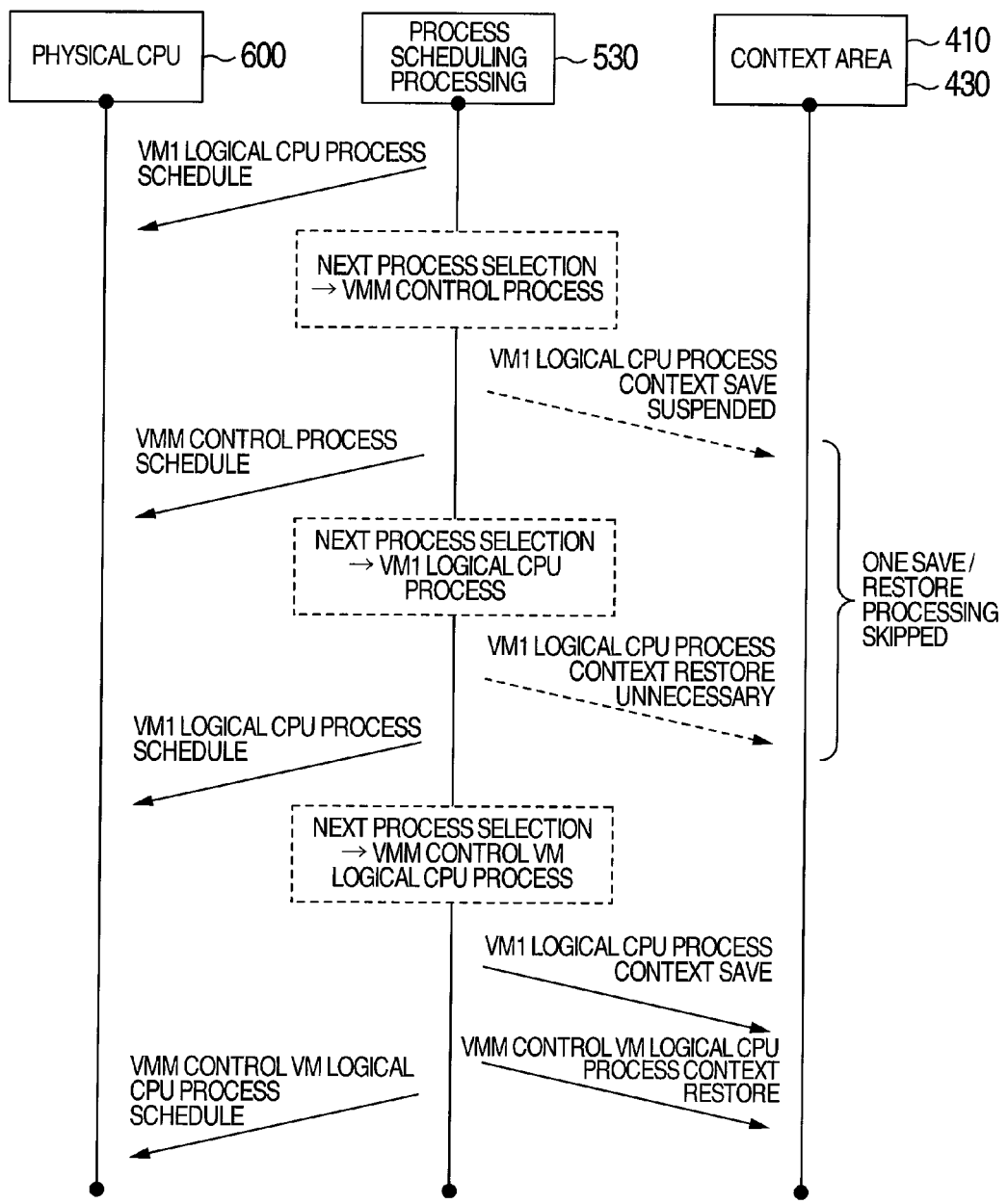
FIG. 11 is a diagram showing the processing of pattern 1 of FIG. 10 by a time chart.

FIG. 10 is a concept diagram showing how the context save/restore is improved by the introduction of the invention. FIG. 11 shows a time chart of the pattern 1.

In the pattern 1 of FIG. 8, the context is saved/restored every time the process is switched even if the same logical CPU process 710 runs continuously through the VMM control process 740. Meanwhile, the save of the context of the relevant process is temporarily suspended at the time of switching the process according to the present invention (FIG. 10). Specifically, the process scheduling processing 530 instructs to set a save/restore skip flag in the process control block without performing the context save of the physical CPU, namely the storage of the register state of the CPU and the rewrite of the pointer to the VM control architecture. Thus, if the same logical CPU process runs continuously again, it becomes unnecessary (not restored) to move the context from the context area again. In other words, if the same logical CPU process runs continuously, one save/restore processing can be skipped (omitted), and a useless process (overhead) can be omitted.

In the pattern 2, the logical CPU process 730 of the VMM control VM is running during the logical CPU process 710 of the VM1. Similar to the pattern 1, the save of the logical CPU process of the VM1 is temporarily suspended, but when another logical CPU process runs in that period, the context of the logical CPU process of the suspended VM1 is saved late. A procedure to determine that the save is suspended and the same process has run is described in detail with reference to FIG. 12 to FIG. 14.

Even if the save of the context is suspended, the context can be restored without contradiction by saving late if necessary if the logical CPU process of the VM1 is scheduled again after the VMM control VM.

Figure 12:
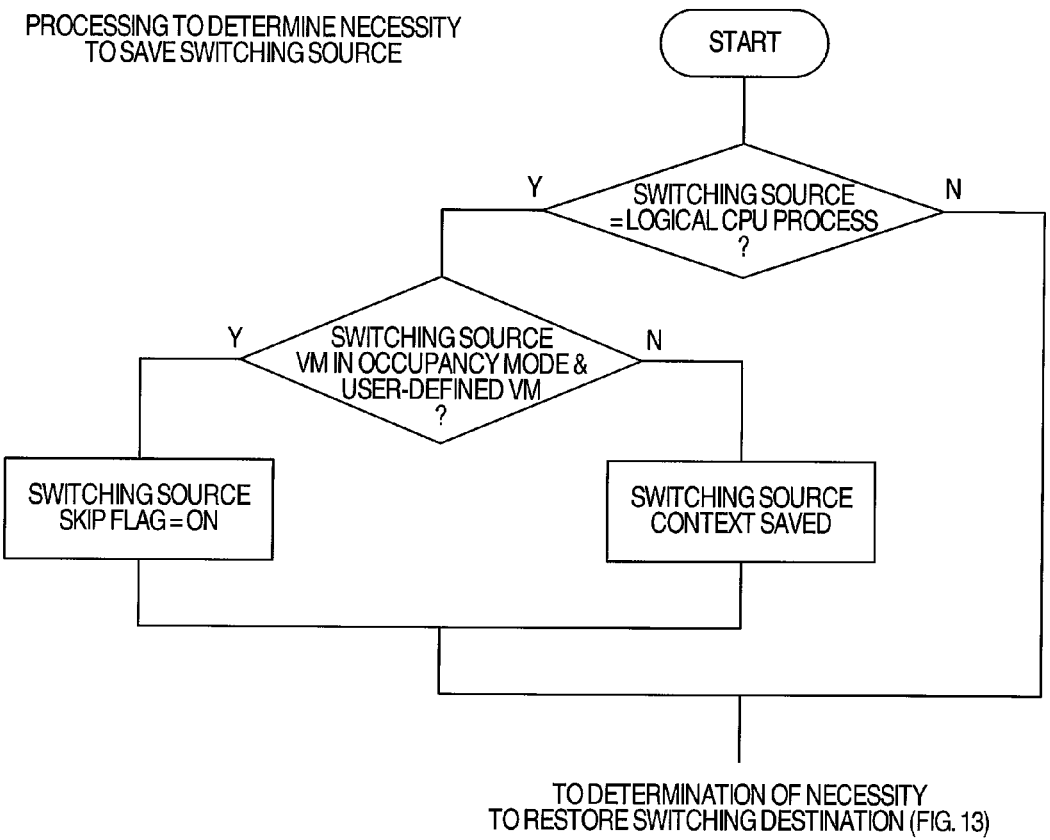
FIG. 12 is a flow chart showing processing to determine whether it is necessity to save a switching source process in a skipping algorithm of a context save/restore processing according to the embodiment of the invention.
Figure 13:
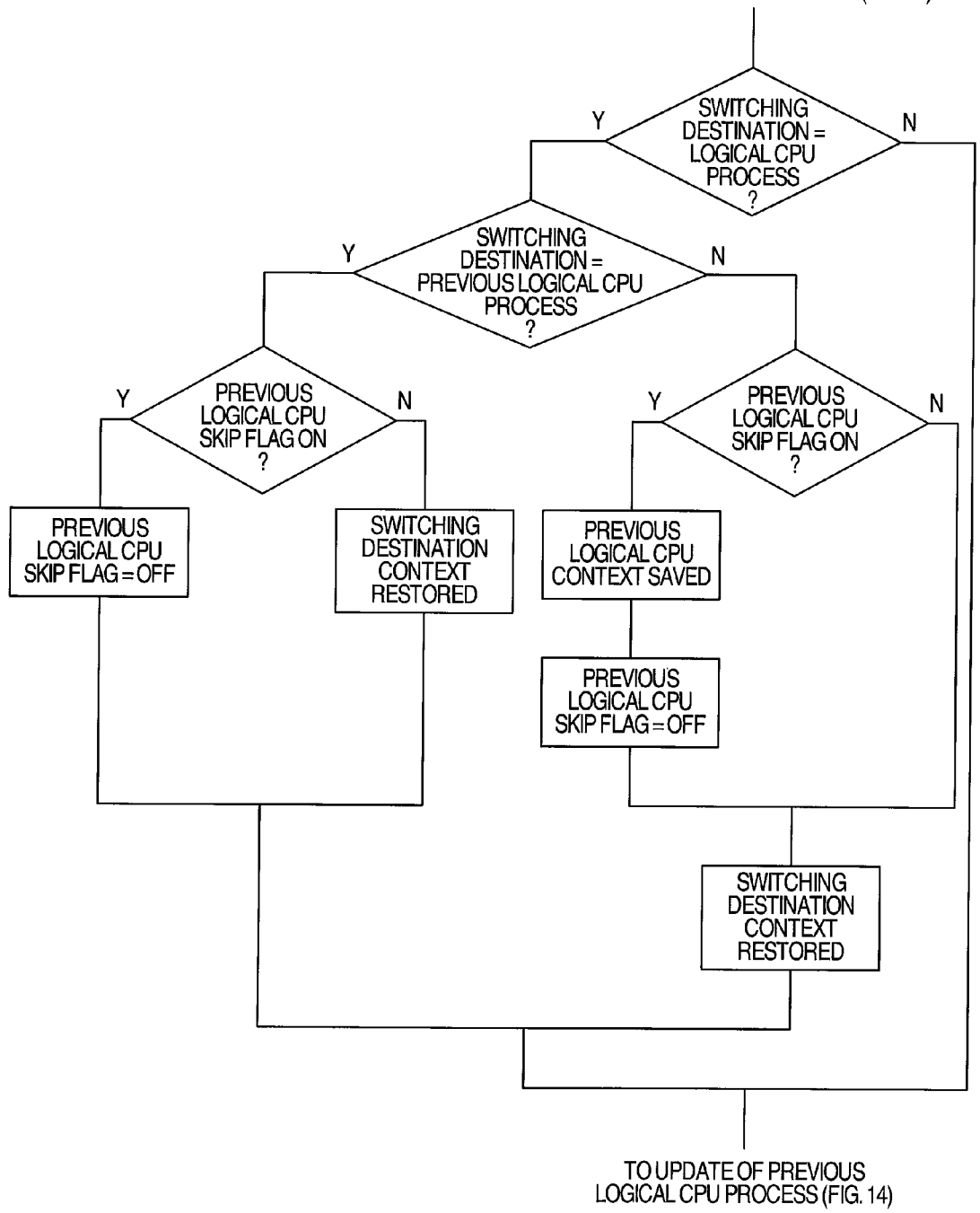
FIG. 13 is a flow chart showing processing to determine whether it is necessary to restore a switching destination process in a skipping algorithm of a context save/restore processing according to the embodiment of the invention.
Figure 14:
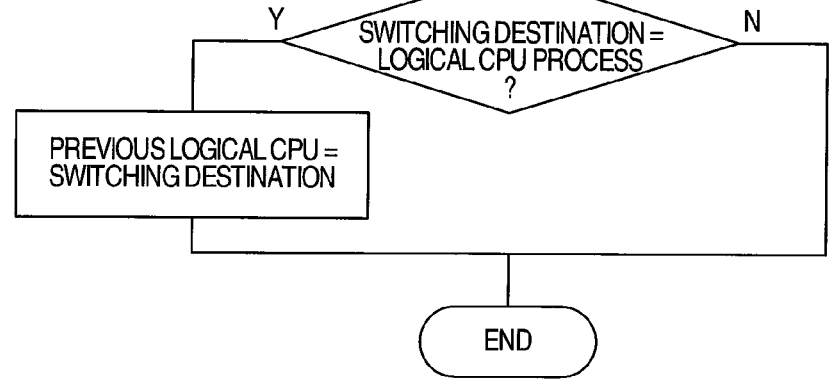
FIG. 14 is a flow chart showing update processing of the previous logical CPU process pointer in a skipping algorithm of a context save/restore processing according to the embodiment of the invention.

FIG. 12 to FIG. 14 show a flow chart of an algorithm for skipping the context save/restore by the process scheduling processing 530 of the VMM. The processing flow is divided into three: (1) determination of necessity of the context save of a switching source process (FIG. 12), (2) determination of necessity of the context restore of a switching destination process (FIG. 13), and (3) update of the logical CPU process which has run previously on the relevant physical CPU (FIG. 14). They are described sequentially below.

(1) First, the process scheduling processing 530 of the VMM determines the necessity of the context save of the switching source process (currently running process) (FIG. 12).

The switching source process pointer 800-1 is obtained from the scheduling control table, and it is determined whether or not it is a logical CPU process from the process identification information 710-1 of the switching source process. Specifically, the process identification information 710-1 includes an ID capable of uniquely identifying a type of the process, and it is checked whether it indicates the logical CPU.

When the switching source process is not a logical CPU process, it is not necessary to save the context, and the procedure shifts to the processing (2).

When the switching source process is a logical CPU process, it is then determined from the process identification information 710-1 whether or not the VM of the switching source process is "in a CPU occupancy mode and a user-defined VM (not a VMM control VM)".

Figure 15:
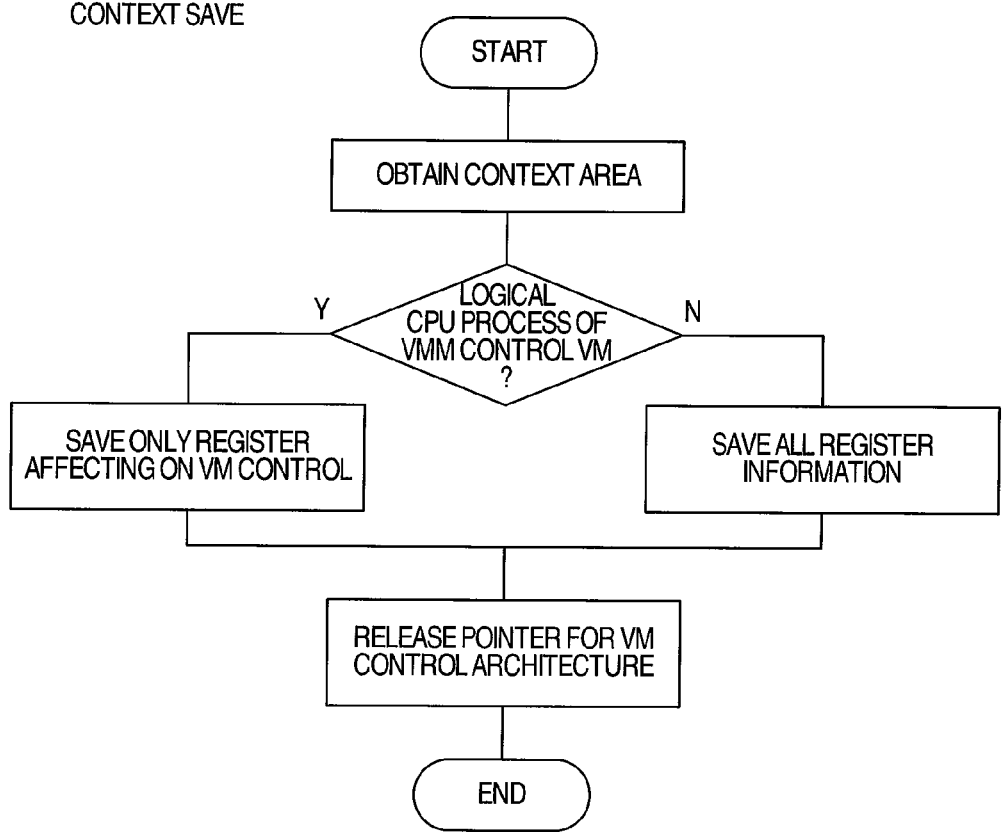
FIG. 15 is a flow chart selectively showing the details of the context save processing shown in FIG. 12.

When the VM of the switching source process is in the CPU occupancy mode or it is the VMM control VM, it is determined that a skip cannot be performed, and the context is saved. Specifically, as shown in FIG. 15, the corresponding context area 410 is obtained from the pointer 710-2 for the context area, the register state 610-1 of the physical CPU is stored as the register information 410-1 of the logical CPU, and the pointer for the VM control architecture 410-2, which is referred to by the pointer 610-2 for the VM control architecture, is released. At this time, when the logical CPU process to save the context is for the VMM control VM, only the register information which affects on the running of the VM is saved excepting, for example, a register in which CPU inherent information is stored.

When the VM of the switching source process is in the CPU occupancy mode and the VM such as VM1 or VM2 defined by the user, there is a possibility that the save/restore can be skipped. The process scheduling processing 530 holds the physical CPU context 610 as it is, and the context save/restore skip flag 710-3 is turned on to suspend the save.

(2) Then, the process scheduling processing 530 of the VMM determines whether or not it is necessary to restore the context of switching destination process (FIG. 13). First, it is determined from the process identification information 710-1 of the switching destination process whether or not it is a logical CPU process. This is the same operation as the process (1).

When the switching destination process is not a logical CPU process, it is not necessary to restore the context. And, the procedure shifts to the processing (3).

When the switching destination process is a logical CPU process, the previous logical CPU process pointer 800-2 is obtained from the scheduling control table, and it is determined whether or not the switching destination process is equivalent to the previous logical CPU process (the logical CPU process run last on the relevant physical CPU). Processes when the conditions are established and not are described in (2.1) and (2.2) below.

(2.1) When the switching destination process and the previous logical CPU process are not equivalent, the restore cannot be skipped. At this time, the operation varies depending on whether the save/restore skip flag of the previous logical CPU process is on/off.

When the save/restore skip flag of the previous logical CPU process is on, the save was suspended in (1) above, but it was a case that the same logical CPU process did not run continuously. Therefore, the context of the previous logical CPU process of which save was suspended is saved this time, and the save/restore skip flag is turned off.

When the save/restore skip flag is off, the context of the previous logical CPU process is in a saved state, and no operation is performed.

Figure 16:
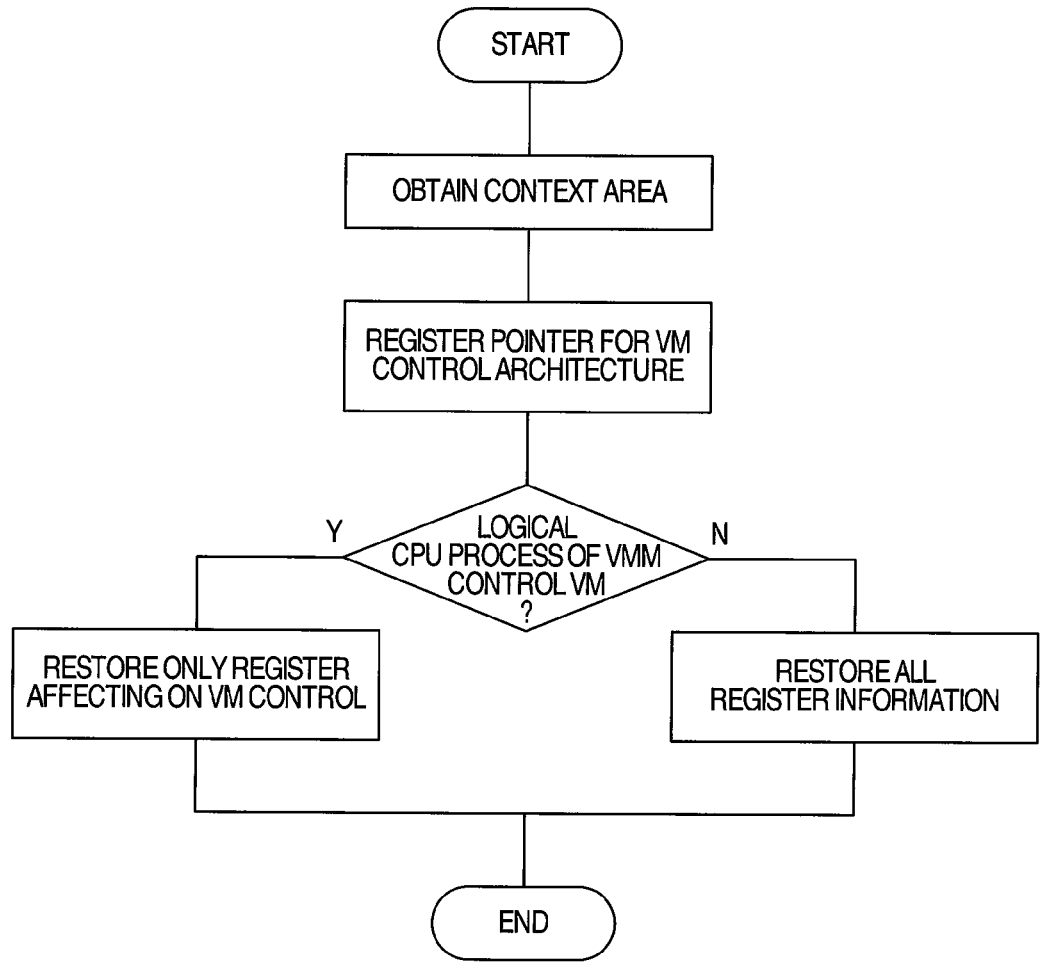
FIG. 16 is a flow chart selectively showing the details of the context restore processing shown in FIG. 13.

In either case, the context of the switching destination is restored last. As shown in FIG. 16, the corresponding context area 410 is obtained from the pointer 710-2 for the context area, and the register information 410-1 of the logical CPU is recovered to the register 610-1 of the physical CPU, which is then registered to the pointer 610-2 for the VM control architecture so that the VM control architecture 410-2 can be referred to. At this time, when the logical CPU process for saving the context is for the VMM control VM, the register information limited to the necessary one and saved is restored as described above. When the context restore processing of the switching destination is completed, the procedure is shifted to the processing (3).

(2.2) When the switching destination process and the previous logical CPU process are equivalent to each other, there is a possibility that the restore can be skipped.

But, when the save/restore skip flag of the previous logical CPU process is off, it is a case that the save was not suspended in the CPU sharing mode or the like, so that skip cannot be made. In such a case, the context of the switching destination is restored, and the procedure is shifted to the processing (3).

The restore can be skipped when the skip flag of the previous logical CPU process is on. It is a case that the save is suspended in (1), and the same logical CPU process runs again, so that the save/restore skip flag is turned off, the context save processing of the previous logical CPU process or the context restore processing of the switching destination process is not performed, and the save/restore is skipped.

(3) Lastly, the process scheduling processing 530 of the VMM performs update processing of the previous logical CPU process (FIG. 14).

When the switching destination process is a logical CPU process, the previous logical CPU process pointer 800-2 of the scheduling control table 800 of the relevant physical CPU is updated to the switching destination process.

All processing in FIG. 12 to FIG. 14 is performed by the process scheduling processing 530.

As described above, in the CPU occupancy mode, the skip of the context save/restore can contribute to the overhead reduction.

This system is also applicable to the CPU sharing mode. But, since the CPU sharing mode is scheduled to any one of arbitrary physical CPUs as described above, it is unlikely that the same logical CPU process runs continuously, and the context must be saved/restored in many cases. Therefore, it is not very important to provide the sharing mode with a function of skipping the save, but it is also effective to skip the save/restore depending on the timing of processing.

Overhead due to switching of the contexts of the VMM can be reduced. Thus, it becomes possible to efficiently operate the CPU resource, and improvement of general-purpose performance can be expected. Especially, a system such as a database system that the processes are frequently switched by I/O interruption is expected to have performance improvement, and it becomes possible to expand the application range of the virtual machine system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A virtual machine system comprising: a physical CPU; a virtual machine hypervisor which logically divides the physical CPU to obtain a plurality of virtual machines; and a virtual machine control memory which is used by the virtual machine hypervisor to control the virtual machines, wherein:

the virtual machines have a CPU sharing mode that the physical CPU is shared among the plural virtual machines, and a CPU occupancy mode that a predetermined virtual machine among the plural virtual machines occupies the physical CPU;

the physical CPU has an internal memory for storing a physical context corresponding to a process under execution;

the virtual machine control memory has a logical context area corresponding to the physical context;

the process is any one of a first logical CPU process which is a process of a logical CPU of the virtual machine, a second logical CPU process which is a process of a logical CPU of a virtual machine for the virtual machine hypervisor, and a control process of the virtual machine hypervisor;

the virtual machine hypervisor has a process control block for managing a saving operation of the physical context to the logical context area when processes of the virtual machines are switched;

when the virtual machine hypervisor selects the control process as a next process, the virtual machine hypervisor determines whether or not a process under execution in the physical CPU is any one of the first logical CPU process and the second logical CPU process;

in a case that the process under execution is the first logical CPU process of the CPU occupancy mode according to the determination, the virtual machine hypervisor turns ON a suspending flag of the process control block which suspends saving of a physical context corresponding to the process under execution;

in a case that the process under execution is the first logical CPU process of the CPU sharing mode according to the determination, the virtual machine hypervisor turns OFF the suspending flag of the process control block which suspends saving of the physical context corresponding to the process under execution, and saves the physical context corresponding to the first logical CPU process of the CPU sharing mode to the corresponding logical context area;

in a case that the process under execution is the second logical process according to the determination, the virtual machine hypervisor turns OFF the suspending flag of the process control block which suspends saving of the physical context corresponding to the process under execution, and saves the physical context corresponding to the second logical CPU process to the corresponding logical context area;

when the virtual machine hypervisor selects the first logical CPU process as a next process of the control process, the virtual machine hypervisor refers to the suspending flag in the logical CPU process executed before the control process;

in a case that the referred suspending flag is turned ON, the physical CPU executes the first logical CPU process of the CPU occupancy mode by referring to the physical context of the internal memory, saving of which is suspended, and turns OFF the suspending flag referred to by the virtual machine hypervisor;

in a case that the referred suspending flag is turned OFF, the virtual machine hypervisor restores a physical context from the logical context area into the internal memory, the physical context corresponding to the first logical CPU process of the CPU sharing mode, and the physical CPU executes the first logical CPU process of the CPU sharing mode by referring to the restored physical context corresponding to the first logical CPU process of the CPU sharing mode;

when the virtual machine hypervisor selects the second logical CPU process as a next process of the control process, the virtual machine hypervisor refers to the suspending flag in the logical CPU process executed before the control process;

in a case that the referred suspending flag is turned ON, the virtual machine hypervisor saves the physical context of the internal memory, saving of which is suspended, into the corresponding logical context area, and turns OFF the referred suspending flag, the virtual machine hypervisor restores a physical context corresponding to the second logical CPU process from the logical context area into the internal memory, the physical CPU executes the second logical CPU process by referring to the restored physical context corresponding to the second logical CPU process; and in a case that the referred suspending flag is turned OFF, the virtual machine hypervisor restores a physical context corresponding to the second logical CPU process from the logical context area into the internal memory, and the physical CPU executes the second logical CPU process by referring to the restored physical context corresponding to the second logical CPU process.

2. The virtual machine system according to claim 1, wherein:

when the virtual machine hypervisor selects the first logical CPU process as a next process of the second logical CPU process, the virtual machine hypervisor restores the physical context saved in the logical context area into the internal memory; and the physical CPU executes the first logical CPU process by referring to the restored physical context of the internal memory.

3. The virtual machine system according to claim 1, wherein:

the physical context has physical CPU register status information, and pointer information directed to a virtual machine control structure; and the logical context area has logical CPU register information corresponding to the physical CPU register status information, and virtual machine control structural information corresponding to the pointer information directed to the virtual machine control structure.

4. A virtual machine hypervisor in a virtual machine system comprising: a physical CPU; the virtual machine hypervisor which logically divides the physical CPU to obtain a plurality of virtual machines; and a virtual machine control memory which is used by the virtual machine hypervisor to control the virtual machines, wherein:

the virtual machines have a CPU sharing mode that the physical CPU is shared among the plural virtual machines, and a CPU occupancy mode that a predetermined virtual machine among the plural virtual machines occupies the physical CPU;

the physical CPU has an internal memory for storing a physical context corresponding to a process under execution;

the virtual machine control memory has a logical context area corresponding to the physical context;

the process is any one of a first logical CPU process which is a process of a logical CPU of the virtual machine, a second logical CPU process which is a process of a logical CPU of a virtual machine for the virtual machine hypervisor, and a control process of the virtual machine hypervisor;

the virtual machine hypervisor has a process control block for managing a saving operation of the physical context to the logical context area when processes of the virtual machines are switched;

when the virtual machine hypervisor selects the control process as a next process, the virtual machine hypervisor determines whether or not a process under execution in the physical CPU is any one of the first logical CPU process and the second logical CPU process;

in a case that the process under execution is the first logical CPU process of the CPU occupancy mode according to the determination, the virtual machine hypervisor turns ON a suspending flag of the process control block which suspends saving of a physical context corresponding to the process under execution;

in a case that the process under execution is the first logical CPU process of the CPU sharing mode according to the determination, the virtual machine hypervisor turns OFF the suspending flag of the process control block which suspends saving of the physical context corresponding to the process under execution, and saves the physical context corresponding to the first logical CPU process of the CPU sharing mode to the corresponding logical context area;

in a case that the process under execution is the second logical process according to the determination, the virtual machine hypervisor turns OFF the suspending flag of the process control block which suspends saving of the physical context corresponding to the process under execution, and saves the physical context corresponding to the second logical CPU process to the corresponding logical context area;

when the virtual machine hypervisor selects the first logical CPU process as a next process of the control process, the virtual machine hypervisor refers to the suspending flag in the logical CPU process executed before the control process;

in a case that the referred suspending flag is turned ON, the physical CPU executes the first logical CPU process of the CPU occupancy mode by referring to the physical context of the internal memory, saving of which is suspended, and turns OFF the suspending flag referred to by the virtual machine hypervisor;

in a case that the referred suspending flag is turned OFF, the virtual machine hypervisor restores a physical context from the logical context area into the internal memory, the physical context corresponding to the first logical CPU process of the CPU sharing mode, the physical CPU executes the first logical CPU process of the CPU sharing mode by referring to the restored physical context corresponding to the first logical CPU process of the CPU sharing mode;

when the virtual machine hypervisor selects the second logical CPU process as a next process of the control process, the virtual machine hypervisor refers to the suspending flag in the logical CPU process executed before the control process;

in a case that the referred suspending flag is turned ON, the virtual machine hypervisor saves the physical context of the internal memory, saving of which is suspended, into the corresponding logical context area, and turns OFF the referred suspending flag, the virtual machine hypervisor restores a physical context corresponding to the second logical CPU process from the logical context area into the internal memory, the physical CPU executes the second logical CPU process by referring to the restored physical context corresponding to the second logical CPU process; and in a case that the referred suspending flag is turned OFF, the virtual machine hypervisor restores a physical context corresponding to the second logical CPU process from the logical context area into the internal memory, and the physical CPU executes the second logical CPU process by referring to the restored physical context corresponding to the second logical CPU process.

5. A scheduling method for a virtual machine system comprising: a physical CPU; a virtual machine hypervisor which logically divides the physical CPU to obtain a plurality of virtual machines; and a virtual machine control memory which is used by the virtual machine hypervisor so as to control the virtual machines, wherein:

the virtual machines have a CPU sharing mode that the physical CPU is shared among the plural virtual machines, and a CPU occupancy mode that a predetermined virtual machine among the plural virtual machines occupies the physical CPU;

the physical CPU has an internal memory for storing a physical context corresponding to a process under execution;

the virtual machine control memory has a logical context area corresponding to the physical context;

the process is any one of a first logical CPU process equal to a process of a logical CPU of the virtual machine, a second logical CPU process equal to a process of a logical CPU of a virtual machine for the virtual machine hypervisor, and a control process of the virtual machine hypervisor;

the virtual machine hypervisor has a process control block for managing a saving operation of the physical context to the logical context area when processes of the virtual machines are switched;

the scheduling method comprising the steps of:

determining whether or not a process under execution in the physical CPU is any one of the first logical CPU process and the second logical CPU process by the virtual machine hypervisor when the virtual machine hypervisor selects the control process as a next process;

turning ON a suspending flag of the process control block which suspends saving of a physical context corresponding to the process under execution by the virtual machine hypervisor in case that the process under execution is the first logical CPU process of the CPU occupancy mode according to the determination;

turning OFF the suspending flag of the process control block which suspends saving of the physical context corresponding to the process under execution and saving the physical context corresponding to the first logical CPU process of the CPU sharing mode to the corresponding logical context area by the virtual machine hypervisor in case that the process under execution is the first logical CPU process of the CPU sharing mode according to the determination;

turning OFF the suspending flag of the process control block which suspends saving of the physical context corresponding to the process under execution, and saving the physical context corresponding to the second logical CPU process to the corresponding logical context area by the virtual machine hypervisor in case that the process under execution is the second logical process according to the determination;

referring to the suspending flag in the logical CPU process executed before the control process by the virtual machine hypervisor when the virtual machine hypervisor selects the first logical CPU process as a next process of the control process;

in a case that the referred suspending flag is turned ON, executing the first logical CPU process of the CPU occupancy mode by referring to the physical context of the internal memory, saving of which is suspended, and turning OFF the suspending flag referred to by the virtual machine hypervisor, by the physical CPU;

in a case that the referred suspending flag is turned OFF, restoring by the virtual machine hypervisor a physical context from the logical context area into the internal memory, the physical context corresponding to the first logical CPU process of the CPU sharing mode, executing by the physical CPU the first logical CPU process of the CPU sharing mode by referring to the restored physical context corresponding to the first logical CPU process of the CPU sharing mode, referring by the virtual machine hypervisor to the suspending flag in the logical CPU process executed before the control process when the virtual machine hypervisor selects the second logical CPU process as a next process of the control process;

in a case that the referred suspending flag is turned ON, saving the physical context of the internal memory, saving of which is suspended, into the corresponding logical context area, and turning OFF the referred suspending flag, by the virtual machine hypervisor, restoring by the virtual machine hypervisor a physical context corresponding to the second logical CPU process from the logical context area into the internal memory, executing by the physical CPU the second logical CPU process by referring to the restored physical context corresponding to the second logical CPU process; and in a case that the referred suspending flag is turned OFF, restoring by the virtual machine hypervisor a physical context corresponding to the second logical CPU process from the logical context area into the internal memory, and executing by the physical CPU the second logical CPU process by referring to the restored physical context corresponding to the second logical CPU process.

\* \* \* \* \*